United States Patent
Kido et al.

(10) Patent No.: US 11,802,688 B2
(45) Date of Patent: Oct. 31, 2023

(54) SEAWATER LEAKAGE DETECTION DEVICE IN FEEDWATER SYSTEM, METHOD FOR DETECTING SEAWATER LEAKAGE IN FEEDWATER SYSTEM, AND STEAM TURBINE PLANT

(71) Applicant: MITSUBISHI HITACHI POWER SYSTEMS, LTD., Kanagawa (JP)

(72) Inventors: Haruka Kido, Kanagawa (JP); Akihiro Hamasaki, Kanagawa (JP); Masato Kanedome, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 871 days.

(21) Appl. No.: 16/755,663

(22) PCT Filed: Jul. 25, 2018

(86) PCT No.: PCT/JP2018/027966
§ 371 (c)(1),
(2) Date: Apr. 13, 2020

(87) PCT Pub. No.: WO2019/077832
PCT Pub. Date: Apr. 25, 2019

(65) Prior Publication Data
US 2020/0256218 A1 Aug. 13, 2020

(30) Foreign Application Priority Data
Oct. 17, 2017 (JP) .................... 2017-201301

(51) Int. Cl.
*F22B 37/38* (2006.01)
*F22B 37/42* (2006.01)
(Continued)

(52) U.S. Cl.
CPC .......... *F22B 37/421* (2013.01); *F01K 13/003* (2013.01); *F22B 37/025* (2013.01);
(Continued)

(58) Field of Classification Search
CPC ...... F01K 13/003; F22B 37/025; F22B 37/38; F22B 37/421
See application file for complete search history.

(56) References Cited

U.S. PATENT DOCUMENTS

| 6,686,751 B1 | 2/2004 | Saito et al. |
| 2001/0007193 A1 | 7/2001 | Kitz |

(Continued)

FOREIGN PATENT DOCUMENTS

| CA | 2603431 A1 * | 10/2006 |
| CL | 105008800 | 10/2015 |

(Continued)

OTHER PUBLICATIONS

Office Action dated Jul. 14, 2021 in Korean Patent Application No. 10-2020-7010340, with English-language translation.
(Continued)

*Primary Examiner* — Jonathan R Matthias
(74) *Attorney, Agent, or Firm* — Wenderoth, Lind & Ponack, L.L.P.

(57) ABSTRACT

In a seawater leakage detection device in a feedwater system, a method for detecting seawater leakage in a feedwater system, and a steam turbine plant, an ammonia addition device configured to add ammonia as a pH adjusting agent to feedwater at an upstream side of a high-pressure drum in a feedwater line, an acid electrical conductivity meter configured to measure an acid electrical conductivity of drum water in the high-pressure drum, and a control device configured to control the ammonia addition device such that a pH value of drum water in the heat recovery steam generator expresses alkalinity equal to or greater than a preset predetermined value, calculate a chlorine ion concentration of drum water on the basis of the acid electrical conductivity measured by the acid electrical conductivity meter, and determine whether leakage of seawater is detected are provided.

9 Claims, 2 Drawing Sheets

(51) Int. Cl.
*F01K 13/00* (2006.01)
*F22B 37/02* (2006.01)
*C02F 1/00* (2023.01)
*F22B 37/22* (2006.01)

(52) U.S. Cl.
CPC .............. *F22B 37/38* (2013.01); *C02F 1/00* (2013.01); *F22B 37/228* (2013.01); *F22B 37/42* (2013.01)

(56) References Cited

U.S. PATENT DOCUMENTS

| | | | |
|---|---|---|---|
| 2015/0377078 | A1 | 12/2015 | Anai |
| 2017/0008784 | A1* | 1/2017 | Shimpo ................ C02F 1/686 |

FOREIGN PATENT DOCUMENTS

| | | |
|---|---|---|
| CN | 106286170 | 1/2017 |
| DE | 600 29 575 | 8/2007 |
| JP | 2007-268397 | 10/2007 |
| JP | 2009-243972 | 10/2009 |
| JP | 2016-31154 | 3/2016 |
| JP | 2017-154049 | 9/2017 |
| WO | 2014/129244 | 8/2014 |

OTHER PUBLICATIONS

Office Action dated May 14, 2021 in corresponding Chinese Patent Application No. 201880066722.3, with English translation.
International Search Report dated Oct. 30, 2018 in International (PCT) Application No. PCT/JP2018/027966 with English-language translation.
Written Opinion of The International Searching Authority dated Oct. 30, 2018 in International (PCT) Application No. PCT/JP2018/027966 with English-language translation.

* cited by examiner

SEAWATER LEAKAGE DETECTION DEVICE IN FEEDWATER SYSTEM, METHOD FOR DETECTING SEAWATER LEAKAGE IN FEEDWATER SYSTEM, AND STEAM TURBINE PLANT

TECHNICAL FIELD

The present invention relates to a seawater leakage detection device in a feedwater system and a method for detecting seawater leakage in a feedwater system with which seawater leaking into a feedwater system is detected in a combined cycle plant including a gas turbine, a heat recovery steam generator, and a steam turbine; and a steam turbine plant to which a seawater leakage detection device in a feedwater system is applied.

BACKGROUND ART

In a combined cycle plant, first electricity is produced by driving a gas turbine using natural gas or the like as fuel, a heat recovery steam generator then recovers heat of exhaust gas discharged from the gas turbine and produces steam, and second electricity is produced by driving a steam turbine using the steam. In addition, in the combined cycle plant, the used steam used to drive the steam turbine is cooled by a condenser and is converted into condensed water, and the condensed water is returned to the heat recovery steam generator. The condenser cools steam using seawater.

If a cooling tube of the condenser through which the seawater flows is damaged for some reason, the seawater may be mixed with the condensed water. In such a case, a seawater component is concentrated in a drum of an evaporator in the feedwater system of the heat recovery steam generator, magnesium chloride is hydrolyzed to produce magnesium hydroxide, and the magnesium hydroxide precipitates. The magnesium hydroxide causes scale to be produced on the inner wall of a feedwater tube, and this may cause problems such that heat transfer is blocked, corrosion occurs, and the like. Furthermore, hydrochloric acid is produced by chloride ions released from magnesium chloride, and the produced hydrochloric acid may reduce pH of the drum water, which may cause corrosion of the feedwater tube.

An example of technology with an object of resolving such a problem is described in Patent Document 1, below. In the technology described in Patent Document 1, an acid electrical conductivity of condensed water at near an outlet of the condenser is obtained, a flow rate of drum water to be blown out with respect to a predetermined flow rate of feedwater is specified on the basis of the acid electrical conductivity such that a Cl concentration of drum water is kept under a predetermined Cl concentration, and a flow rate of drum water to be blown out is controlled to be the specified flow rate of drum water to be blown out.

CITATION LIST

Patent Document

Patent Document 1: JP 2016-031154 A

SUMMARY OF INVENTION

Technical Problem

In the conventional technology described above, an acid electrical conductivity of the condensed water at near the outlet of the condenser is obtained, and a Cl concentration is estimated on the basis of the acid electrical conductivity. However, in a case that seawater is mixed with condensed water, and an amount of the mixed seawater is very small, a Cl concentration of the condensed water is low. In a range near detection limitations of the acid electrical conductivity, it is difficult to estimate a Cl concentration with high accuracy on the basis of the obtained acid electrical conductivity of condensed water.

To solve the problems described above, an object of the present invention is to provide a seawater leakage detection device in a feedwater system, a method for detecting seawater leakage in a feedwater system, and a steam turbine plant. In the device and method, the presence or absence of seawater leaking into the feedwater can be detected with high accuracy regardless of the amount of leakage of seawater.

Solution to Problem

To achieve the object described above, a seawater leakage detection device in a feedwater system according to an aspect of the present invention in a steam turbine plant including a heat recovery steam generator including a steam drum configured to produce steam using exhaust heat of exhaust gas, a steam turbine configured to be driven by the steam produced by the heat recovery steam generator, and a condenser configured to return feedwater produced by cooling steam discharged from the steam turbine with seawater to the heat recovery steam generator, includes a pH adjusting agent addition device configured to add a pH adjusting agent to feedwater at an upstream side of the steam drum in a feedwater line, an acid electrical conductivity meter configured to measure an acid electrical conductivity of drum water in the steam drum, and a control device configured to control the pH adjusting agent addition device such that a pH value of the drum water in the heat recovery steam generator expresses alkalinity equal to or greater than a preset predetermined value, calculate a chlorine ion concentration of the drum water on the basis of the acid electrical conductivity measured by the acid electrical conductivity meter, and determine whether seawater leakage is detected.

Since a seawater component of condensed water mixed with seawater is concentrated in a drum of an evaporator, an acid electrical conductivity can be effectively measured by using the drum water in the drum. However, since phosphoric acid is normally poured into the drum of the evaporator for the purpose of pH adjustment for water quality management, the phosphoric acid becomes an interference component, making it difficult to measure the acid electrical conductivity of the drum water. Performing the control described above eliminates the need of pouring phosphoric acid conventionally used as a pH adjusting agent of the drum water, and an acid electrical conductivity of the drum water can be measured without interference by the phosphoric acid. A chlorine ion concentration of the drum water is calculated on the basis of the acid electrical conductivity, and thus the seawater leakage can be detected with high accuracy. Since, in a case that seawater leakage occurs, the seawater component is concentrated in the steam drum, seawater leaking into feedwater can be quickly detected with high accuracy by measuring an acid electrical conductivity of the drum water, compared to a case where the acid electrical conductivity is measured at a location other than the steam drum.

In the seawater leakage detection device in a feedwater system according to an aspect of the present invention, a pH measurement device configured to measure a pH value of feedwater at a downstream side of a position where a pH adjusting agent is added in the feedwater line or a pH value of drum water is provided, and the control device controls the pH adjusting agent addition device on the basis of a measurement result of the pH measurement device.

Since a pH value of feedwater or drum water in which the pH adjusting agent is added is fed back to control an added amount of the pH adjusting agent, a pH value of feedwater can be managed with high accuracy.

In the seawater leakage detection device in a feedwater system according to an aspect of the present invention, the pH measurement device measures a pH value of drum water in the steam drum.

Since a pH value of the drum water concentrated in the steam drum is fed back to control an added amount of the pH adjusting agent, a pH value of the feedwater can be managed with higher accuracy.

In the seawater leakage detection device of a feedwater system according to an aspect of the present invention, the heat recovery steam generator includes one or more units that differ from each other in pressure of the feedwater to be treated, and the acid electrical conductivity meter measures an acid electrical conductivity of drum water in the steam drum of at least a unit at the highest pressure of the one or more units.

Since an acid electrical conductivity of drum water concentrated at high pressure in the steam drum in the unit at the highest pressure is measured, the acid electrical conductivity of drum water concentrated to a high concentration for a short period of time can be measured. This allows the presence or absence of seawater leaking into feedwater to be detected with high accuracy.

In the seawater leakage detection device in a feedwater system according to an aspect of the present invention, a water discharge line configured to discharge drum water in the steam drum is provided, and the control device opens the water discharge line in a case that a chlorine ion concentration of drum water exceeds a preset limit value.

Since, in a case that a chlorine ion concentration of the drum water exceeds a limit value, the water discharge line is opened to discharge drum water in the steam drum, a chlorine ion concentration of feedwater in the feedwater line can be reduced.

In the seawater leakage detection device in a feedwater system according to an aspect of the present invention, a pH adjusting agent added by the pH adjusting agent addition device is an alkaline volatile substance.

Since a residual component of the pH adjusting agent which is an alkaline volatile substance is not concentrated in the steam drum and further is discharged out of the feedwater system by a vacuum pump of the condenser, a very small amount of the pH adjusting agent discharged from a chemical injection device is balanced to keep a concentration of chemicals in the feedwater system constant, and this allows a pH value to be controlled.

In the seawater leakage detection device in a feedwater system according to an aspect of the present invention, a pH adjusting agent added by the pH adjusting agent addition device is amines containing at least one of ammonia, hydrazine, monoethanolamine, or morpholine.

Accordingly, an optimum pH adjusting agent can be selected.

A method for detecting seawater leakage in a feedwater system according to an aspect of the present invention includes the steps of adding a pH adjusting agent to feedwater in a feedwater line from a condenser to a boiler, adjusting an added amount of the pH adjusting agent such that a pH value of drum water in a steam drum of the boiler expresses alkalinity equal to or greater than a preset predetermined value, measuring an acid electrical conductivity of drum water, and calculating a chlorine ion concentration of drum water on the basis of the acid electrical conductivity and determining whether seawater leakage is detected.

Since an acid electrical conductivity of drum water concentrated in the steam drum is measured, in a case that seawater leaks into feedwater, a chlorine ion concentration of drum water in the steam drum increases, and this allows the presence or absence of seawater leaking into the feedwater to be detected with high accuracy regardless of an amount of leakage of seawater.

A steam turbine plant according to an aspect of the present invention includes a heat recovery steam generator including a steam drum configured to produce steam using exhaust heat of exhaust gas, a steam turbine configured to be driven by the steam produced by the heat recovery steam generator, a condenser configured to return feedwater produced by cooling steam discharged from the steam turbine with seawater to the heat recovery steam generator, and the seawater leakage detection device in a feedwater system.

Since an acid electrical conductivity of drum water concentrated in the steam drum is measured, in a case that seawater leaks into feedwater, a chlorine ion concentration of drum water in the steam drum increases, and this allows the presence or absence of seawater leaking into the feedwater to be detected with high accuracy regardless of an amount of leakage of seawater.

Advantageous Effect of Invention

According to a seawater leakage detection device in a feedwater system, a method for detecting seawater leakage in a feedwater system, and a steam turbine plant of the present invention, the presence or absence of seawater leaking into feedwater can be detected with high accuracy regardless of an amount of leakage of seawater.

DESCRIPTION OF EMBODIMENTS

The following describes preferable embodiments of a seawater leakage detection device in a feedwater system, a method for detecting seawater leakage in a feedwater system, and a steam turbine plant according to the present invention with reference to the accompanying drawings. Note that the present invention is not limited by these embodiments, and when a plurality of embodiments is present, the present invention is intended to include a configuration combining these embodiments. Note that "steam turbine plant" in the present invention refers to a plant having a function of producing electricity by a steam turbine, and includes a plant configured to produce electricity by a steam turbine alone and a combined cycle plant in which a steam turbine and other means configured to produce electricity are combined.

Figure 1:
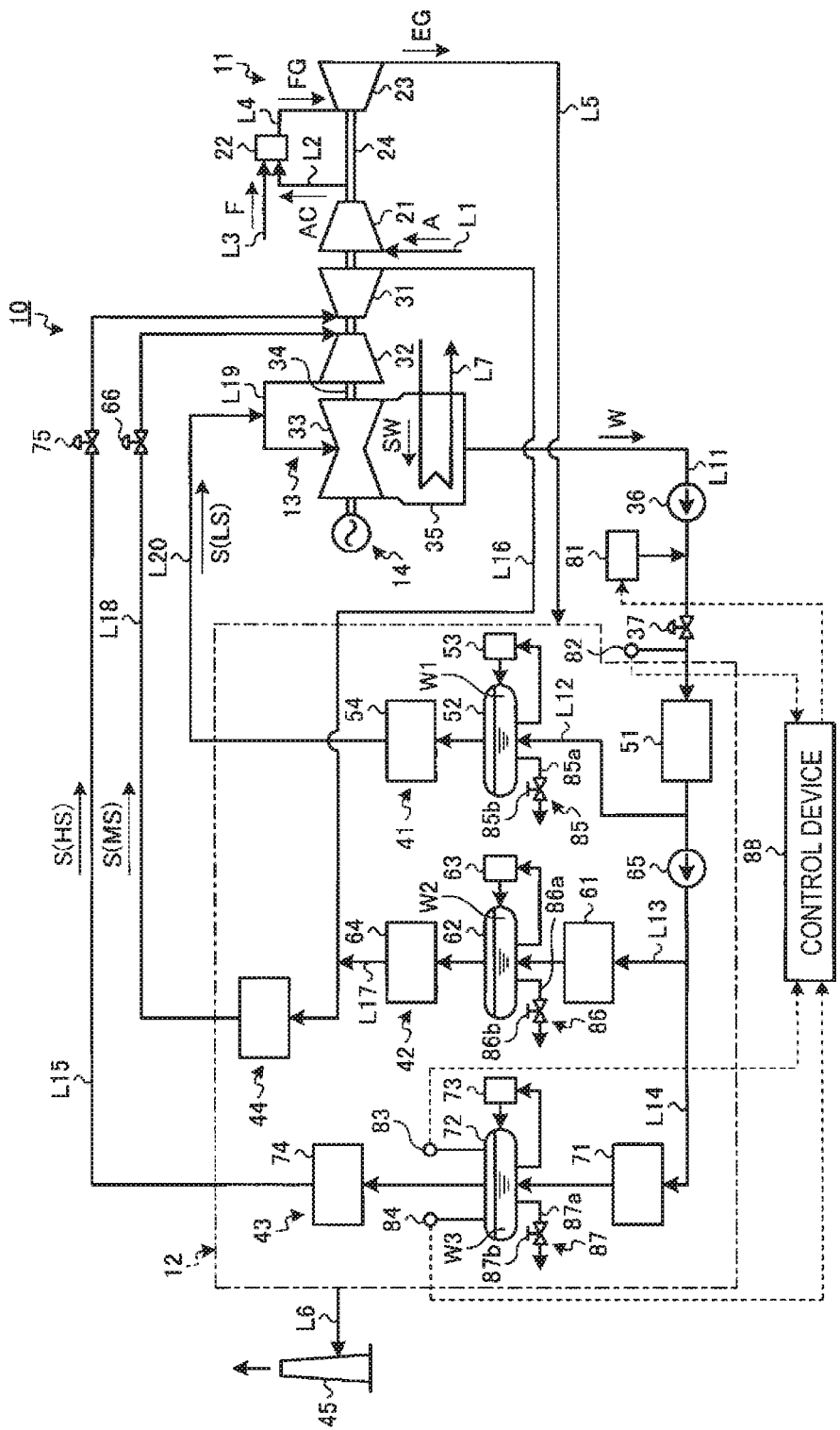
FIG. 1 is a schematic configuration diagram of a combined cycle plant to which a seawater leakage detection device in a feedwater system according to the present embodiment is applied.

FIG. 1 is a schematic configuration diagram illustrating a combined cycle plant to which a seawater leakage detection device in a feedwater system according to the present embodiment is applied.

As illustrated in FIG. 1, in the present embodiment, a combined cycle plant 10 includes a gas turbine 11, a heat recovery steam generator (HRSG) 12, a steam turbine 13, and a power generator 14.

The gas turbine 11 includes a compressor 21, a combustor 22, and a turbine 23, and the compressor 21 and the turbine 23 are connected to each other by a rotor (a rotary shaft) 24 in an integrally rotatable manner. The compressor 21 compresses air A taken in through an air intake line L1 and produces compressed air AC. The combustor 22 mixes and combusts the compressed air AC supplied from the compressor 21 through a compressed air supply line L2 and fuel gas F supplied from a fuel gas supply line L3. The turbine 23 is rotationally driven by combustion gas FG supplied from the combustor 22 through a combustion gas supply line L4.

The heat recovery steam generator 12 produces steam (superheated steam) S using exhaust heat of exhaust gas EG discharged from the gas turbine 11 (the turbine 23) through an exhaust gas discharge line L5. The heat recovery steam generator 12 includes a low-pressure unit 41, an intermediate-pressure unit 42, a high-pressure unit 43, and a reheater 44, which are described later. The exhaust gas EG supplied from the gas turbine 11 is sent upwardly in the heat recovery steam generator 12, and the heat recovery steam generator 12 recovers heat from the exhaust gas EG at the high-pressure unit 43, the intermediate-pressure unit 42, and the low-pressure unit 41 in this order and produces steam S. The heat recovery steam generator 12 is connected to a chimney 45 with an exhaust gas discharge line L6 interposed therebetween, the exhaust gas discharge line L6 being configured to allow the used exhaust gas EG used to produce the steam S to be discharged.

The steam turbine 13 is driven by the steam S produced by the heat recovery steam generator 12. The steam turbine 13 includes a high-pressure turbine 31, an intermediate-pressure turbine 32, and a low-pressure turbine 33. The high-pressure turbine 31, the intermediate-pressure turbine 32, and the low-pressure turbine 33 are connected onto a rotary shaft 34, and the rotary shaft 34 is connected to the rotor 24 of the gas turbine 11 while forming a straight line. The power generator 14 is connected onto the rotary shaft 34. The steam turbine 13 is provided with a condenser 35 configured to cool the steam with which the low-pressure turbine 33 is driven. The condenser 35 cools the used steam S discharged from the low-pressure turbine 33 and converts it to condensed water (feedwater W); and is provided with a cooling water line L7 configured to cool the steam with seawater SW. The condenser 35 supplies the produced condensed water as the feedwater W to the heat recovery steam generator 12 through a feedwater line L11. The feedwater line L11 is provided with a condensed water pump 36 and a condensed water valve 37.

The low-pressure unit 41 of the heat recovery steam generator 12 includes a low-pressure fuel economizer 51, a low-pressure drum 52, a low-pressure evaporator 53, and a low-pressure superheater 54. The feedwater line L11 is provided with a low-pressure feedwater line L12 at a downstream side of the condensed water pump 36 and the condensed water valve 37, and the feedwater W is sent to the low-pressure fuel economizer 51 through the low-pressure feedwater line L12. The low-pressure fuel economizer 51 heats the feedwater W, and the heated feedwater W is sent to the low-pressure drum 52. The low-pressure evaporator 53 heats the feedwater W (hereinafter, drum water W1) of the low-pressure drum 52 and returns the heated feedwater W to the low-pressure drum 52. Low-pressure steam LS in the low-pressure drum 52 is sent to the low-pressure superheater 54 and superheated at the low-pressure superheater 54.

The intermediate-pressure unit 42 includes an intermediate-pressure fuel economizer 61, an intermediate-pressure drum 62, an intermediate-pressure evaporator 63, and an intermediate-pressure superheater 64. The low-pressure feedwater line L12 is provided with an intermediate-pressure feedwater line L13 branching therefrom at a downstream position, and the feedwater W is sent to the intermediate-pressure fuel economizer 61 through the intermediate-pressure feedwater line L13. The intermediate-pressure feedwater line L13 is provided with a feedwater pump 65. The intermediate-pressure fuel economizer 61 heats the feedwater W, and the heated feedwater W is sent to the intermediate-pressure drum 62. The intermediate-pressure evaporator 63 heats the feedwater W (hereinafter, drum water W2) of the intermediate-pressure drum 62 and returns the heated feedwater W to the intermediate-pressure drum 62. Intermediate-pressure steam MS in the intermediate-pressure drum 62 is sent to the intermediate-pressure superheater 64 and superheated at the intermediate-pressure superheater 64.

The high-pressure unit 43 includes a high-pressure fuel economizer 71, a high-pressure drum 72, a high-pressure evaporator 73, and a high-pressure superheater 74. The intermediate-pressure feedwater line L13 is provided with a high-pressure feedwater line L14 branching therefrom at a downstream side of the feedwater pump 65, and the feedwater W is sent to the high-pressure fuel economizer 71 through the high-pressure feedwater line L14. The high-pressure fuel economizer 71 heats the feedwater W, and the heated feedwater W is sent to the high-pressure drum 72. The high-pressure evaporator 73 heats the feedwater W (hereinafter, drum water W3) of the high-pressure drum 72 and returns the heated feedwater W to the high-pressure drum 72. High-pressure steam HS in the high-pressure drum 72 is sent to the high-pressure superheater 74 and superheated at the high-pressure superheater 74.

A high-pressure steam supply line L15 configured to allow the high-pressure steam HS in the high-pressure superheater 74 to be supplied to the high-pressure turbine 31 is provided, and an intermediate-pressure steam recovery line L16 configured to allow the intermediate-pressure steam MS at a reduced pressure after used in the high-pressure turbine 31 to return to the reheater 44 is provided. The high-pressure steam supply line L15 is provided with a high-pressure main steam stop valve 75. An intermediate-pressure steam supply line L17 configured to allow the intermediate-pressure steam MS in the intermediate-pressure superheater 64 to be supplied to the intermediate-pressure steam recovery line L16 is provided. Furthermore, an intermediate-pressure steam supply line L18 configured to allow the intermediate-pressure steam MS superheated in the reheater 44 to be supplied to the intermediate-pressure turbine 32 is provided, and a low-pressure steam transport line L19 configured to allow the low-pressure steam LS at a reduced pressure after used in the intermediate-pressure turbine 32 to be transported to the low-pressure turbine 33 is provided. The intermediate-pressure steam supply line L18 is provided with a reheat steam stop valve 66. A low-pressure steam supply line L20 configured to allow the low-pressure steam LS produced in the low-pressure superheater 54 to be supplied to the low-pressure steam transport line L19 is provided.

Accordingly, during operation of the combined cycle plant 10, in the gas turbine 11, the compressor 21 compresses air, and the combustor 22 mixes and combusts the compressed air AC and the fuel gas F supplied thereto. The turbine 23 is rotationally driven by the combustion gas FG supplied from the combustor 22. In addition, the exhaust gas EG discharged from the gas turbine 11 (the turbine 23) is sent to the heat recovery steam generator 12, and the heat recovery steam generator 12 produces the steam S, and the steam S is sent to the steam turbine 13. The high-pressure turbine 31, the intermediate-pressure turbine 32, and the low-pressure turbine 33 are rotationally driven by the steam S. Then, the power generator 14 disposed coaxially with the gas turbine 11 and the steam turbine 13 produces electricity. Meanwhile, the steam S used in the steam turbine 13 is cooled by the condenser 35, is converted into condensed water, and is returned to the heat recovery steam generator 12 as the feedwater W.

Since, in the condenser 35, the steam S is cooled by the seawater SW and converted into condensed water (feedwater W), a plurality of cooling water tubes constituting the cooling water line L7 are disposed inside the condenser 35. If the cooling water tube is damaged for some reason, the seawater flowing through the cooling water tube is mixed with the condensed water in the condenser 35. As a result, the seawater component may enter the feedwater system of the heat recovery steam generator 12, and this may cause problems such that heat transfer is blocked, corrosion occurs, and the like. Therefore, the seawater leaking into the condenser 35 needs to be detected, and the countermeasure against the seawater leakage needs to be carried out.

The seawater leakage detection device in a feedwater system according to the present embodiment includes an ammonia addition device (a pH adjusting agent addition device) 81, a pH measurement devices 82 and 83, an acid electrical conductivity meter 84, water discharge devices 85, 86 and 87, and a control device 88.

The ammonia addition device 81 adds alkaline and volatile chemicals as a pH adjusting agent, that is, ammonia in a case of the present embodiment, to the feedwater W at an upstream side of the respective drums (steam drum) 52, 62 and 72, and between the condensed water pump 36 and the condensed water valve 37 in the feedwater line L11. Note that the pH adjusting agent added by the pH adjusting agent addition device of the present invention is not limited to ammonia and may be amines containing at least one of ammonia, hydrazine, monoethanolamine, or morpholine. The pH measurement device 82 measures a pH value of the feedwater W at a downstream side of a position where the ammonia addition device 81 adds ammonia and between the low-pressure fuel economizer 51 and the condensed water valve 37 in the feedwater line L11. The pH measurement device 83 measures a pH value of the drum water W3 in the high-pressure drum 72 in the feedwater line L11. Note that the pH measurement device 83 is not limited to a device configured to measure a pH value of the drum water W3 in the high-pressure drum 72 and may be a device configured to measure pH values of the drum water W1 in the low-pressure drum 52 and the drum waver W2 in the intermediate-pressure drum 62.

The acid electrical conductivity meter 84 is provided to the high-pressure unit 43 and measures an acid electrical conductivity of the drum water W3 in the high-pressure drum (steam drum) 72 of the high-pressure unit 43. The heat recovery steam generator 12 includes one or more units (three units 41, 42 and 43 in the present embodiment) that differ from each other in pressure of the feedwater W to be treated, and the acid electrical conductivity meter 84 measures an acid electrical conductivity of the drum water in at least an unit at the highest pressure, that is, in the high-pressure drum 72 of the high-pressure unit 43. Since the level of concentration of the drum water W3 in the high-pressure drum 72 is the highest level, the acid electrical conductivity (chlorine concentration) increases to the highest level when seawater leakage occurs, and this allows the leakage to be detected with high sensitivity. Note that a configuration is possible in which acid electrical conductivity meters 84 are provided to the low-pressure unit 41 and the intermediate-pressure unit 42 in addition to the high-pressure drum 72, and an acid electrical conductivity of the drum water W1 in the low-pressure drum 52 and an acid electrical conductivity of the drum water W2 in the intermediate-pressure drum 62 in the respective units 41 and 42 may be measured. Additionally, a configuration is possible in which acid electrical conductivities of the drum waters W1, W2 and W3 in all the drums 52, 62 and 72 are measured.

The water discharge devices 85, 86 and 87 are configured by water discharge lines 85a, 86a and 87a provided to the respective drums 52, 62 and 72 of the low-pressure unit 41, the intermediate-pressure unit 42, and the high-pressure unit 43; and on-off valves 85b, 86b and 87b provided to the respective water discharge lines 85a, 86a and 87a.

The control device 88 is input with the measurement results of the pH measurement devices 82 and 83 (the pH values of the feedwater W and the drum water W3) and the measurement result of the acid electrical conductivity meter 84 (the acid electrical conductivities of the drum water W3); and can control the ammonia addition device 81 and the water discharge devices 85, 86 and 87 (the on-off valves 85b, 86b and 87b). In other words, the control device 88 controls the ammonia addition device 81 such that the pH values of the feedwater W and the drum water W3 measured by the pH measurement devices 82 and 83 expresses alkalinity equal to or greater than a preset predetermined value, calculates a chlorine ion concentration of the drum water W3 on the basis of the acid electrical conductivity measured by the acid electrical conductivity meter 84, and determines whether seawater leakage is detected. In a case that the chlorine ion concentration of the drum water W3 exceeds a preset limit value, the control device 88 opens the on-off valves 85b, 86b and 87b of the respective water discharge lines 85a, 86a and 87a. Note that the control device 88 may control the ammonia addition device 81 on the basis of either one of the pH value of the feedwater W measured by the pH measurement device 82 or the pH value of the drum water W3 measured by the pH measurement device 83.

Here, the preset predetermined value (lower limit value) of the drum water W3 is pH9.4, and the upper limit value is pH10.0, for example. Accordingly, in a case that a pH value of the drum water W3 is below pH9.4, the control device 88 controls the ammonia addition device 81 to start adding ammonia to the feedwater W or to increase the added amount of ammonia to the feedwater W. In a case that a pH value of the drum water W3 exceeds pH10.0, the control device 88 controls the ammonia addition device 81 to stop adding the pH adjusting agent to the feedwater W or to decrease the added amount of ammonia to the feedwater W.

The control device 88 calculates the chlorine ion concentration of the drum water W3 on the basis of the acid electrical conductivity measured by the acid electrical conductivity meter 84 while the pH value of the drum water W3 is maintained from pH9.4 to pH10.0, and determines whether the seawater leakage is detected on the basis of the chlorine ion concentration. In this case, a relationship between the acid electrical conductivity of the drum water W3 and the chlorine ion concentration of the drum water W3 is obtained in advance from experiment or the like.

For example, in a case that seawater leaks into the feedwater W, a concentration level of chlorine ions in the high-pressure drum 72 per hour can be obtained by Equation (1) below.

[Math. 1]

CONCENTRATION OF CHLORIDE ION PER HOUR [TIMES]=DRUM FEEDWATER AMOUNT [m³/h]/DRUM RETAINED WATER AMOUNT [m³]   (1)

A relationship between an acid electrical conductivity and a chlorine ion concentration can be obtained by Equation (2) below.

[Math. 2]

CHLORINE ION CONCENTRATION [Cl⁻][mol/L]= CHLORINE ION CONCENTRATION [mg/L]/1000 [mg/g]/35.5 [g/mol]   (2)

Here, positive and negative ions are equal, and Equation (3) below is obtained.

[Math. 3]

$$[Cl^-]+[OH^-]=[H^+] \quad (3)$$

From the dissociation equilibrium of water, Equation (4) below can be obtained, where, Kw is a dissociation constant $10^{14}$ [mol/L]².

[Math. 4]

$$[OH^-][H^+]=K_w \quad (4)$$

Then, Equations (1) to (4) are solved for [H⁺], and Equation (5) below is obtained.

[Math. 5]

$$[H^+] = \frac{[Cl^-] + \sqrt{[Cl^-]^2 + 4k_w}}{2} \quad (5)$$

In a case that the chlorine ion concentration [mg/L] is determined in this manner, various ion concentrations can be calculated as follows. Accordingly, the acid electrical conductivity can be obtained by Equation (6) below.

[Math. 6]

ACID ELECTRICAL CONDUCTIVITY [μS/cm]=(Λ(H⁺)[H⁺]+Λ(Cl⁻)[Cl⁻]+Λ(OH⁻)[OH⁻])×1000   (6)

Λ(H⁺): an equivalent ion conductivity of hydrogen ions of 349.7 [S·cm²/mol equivalent]

Λ(Cl⁻): an equivalent ion conductivity of chlorine ions of 76.3 [S·cm²/mol equivalent]

Λ(OH⁻): an equivalent ion conductivity of mercury ions of 198 [S·cm²/mol equivalent]

Figure 2:
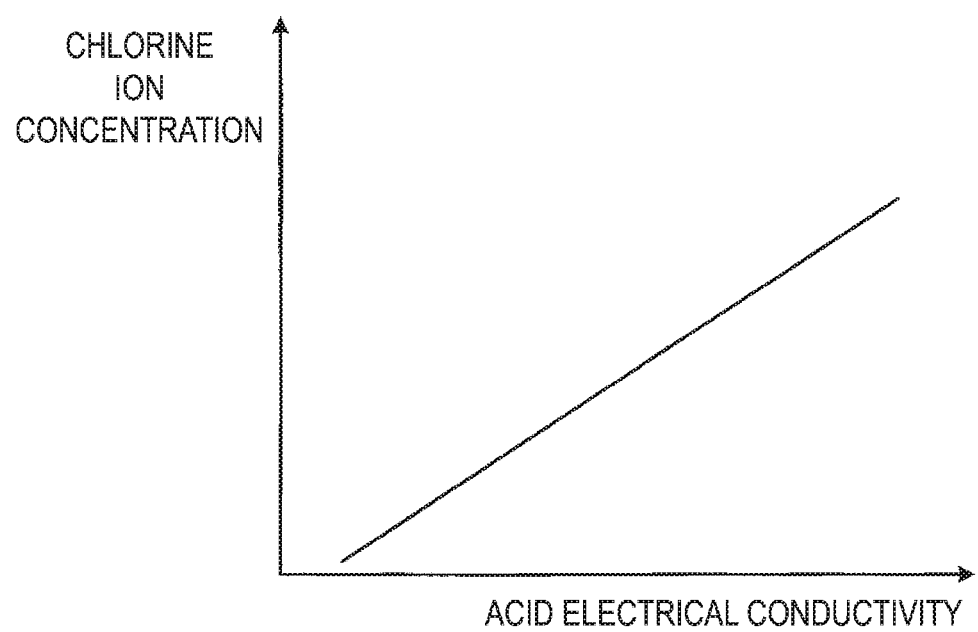
FIG. 2 is a graph showing a chlorine ion concentration relative to an acid electrical conductivity.

FIG. 2 is a graph showing a chlorine ion concentration relative to an acid electrical conductivity. As described above, since an acid electrical conductivity and a chlorine ion concentration have a correlation with each other, and a relationship between a calculated acid electrical conductivity and a chlorine ion concentration is substantially the same as a relationship between a measured acid electrical conductivity and a chlorine ion concentration, as showed in FIG. 2, a graph showing a chlorine ion concentration relative to an acid electrical conductivity can be set. Information on a correlation between an acid electrical conductivity and a chlorine ion concentration is stored in a storage (not illustrated) in the control device 88.

Accordingly, as illustrated in FIG. 1, during operation of the combined cycle plant 10, the steam S used in the steam turbine 13 is cooled by the condenser 35, converted into condensed water, and returned to the heat recovery steam generator 12 as the feedwater W. At this time, the ammonia addition device 81 adds ammonia to the feedwater W flowing through the feedwater line L11. The pH measurement device 82 measures a pH value of the feedwater W, and the pH measurement device 83 measures a pH value of the drum water W3. The control device 88 controls the ammonia addition device 81 such that a measured pH value of the drum water W3 falls within a preset pH range (from pH9.4 to pH10.0). Note that a relationship between a pH value of the feedwater W and a pH value of the drum water W3 may be obtained in advance from experiment or the like, only the pH value of the feedwater W may be measured without measuring a pH value of the drum water W3, and the pH value of the drum water W3 may be estimated on the basis of the pH value of the feedwater W. In addition, at this time, the acid electrical conductivity meter 84 measures an acid electrical conductivity of the drum water W3 in the high-pressure drum 72, and the control device 88 calculates a chlorine ion concentration of the drum water W3 using a correlation diagram of FIG. 2 on the basis of the measured acid electrical conductivity of the drum water W3 and determines whether seawater leakage is detected. Here, in a case that the chlorine ion concentration of the drum water W3 exceeds the preset limit value, the control device 88 opens the on-off valves 85b, 86b and 87b of the respective water discharge lines 85a, 86a and 87a.

As described above, a seawater leakage detection device in a feedwater system according to the present embodiment includes the heat recovery steam generator 12 including the high-pressure drum 72 configured to produce the steam S using exhaust heat of the exhaust gas EG, the steam turbine 13 configured to be driven by the steam S produced by the heat recovery steam generator 12, and the condenser 35 configured to return the feedwater W produced by cooling the steam S discharged from the steam turbine 13 with the seawater SW to the heat recovery steam generator 12. The seawater leakage detection device further includes the ammonia addition device 81 configured to add ammonia (pH adjusting agent) to the feedwater W at an upstream side of the high-pressure drum 72 in the feedwater line L11, the acid electrical conductivity meter 84 configured to measure an acid electrical conductivity of the drum water W3 in the high-pressure drum 72, and the control device 88 configured to control the ammonia addition device 81 such that a pH value of the drum water W3 in the heat recovery steam generator 12 expresses alkalinity equal to or greater than a preset predetermined value, calculate a chlorine ion concentration of the drum water W3 on the basis of the acid electrical conductivity measured by the acid electrical conductivity meter 84, and determine whether leakage of the seawater SW is detected.

Accordingly, since the seawater component of the feedwater W mixed with the seawater SW is concentrated in the high-pressure drum 72 of the high-pressure evaporator 73, an acid electrical conductivity can be effectively measured using the drum water W3 in the high-pressure drum 72.

However, since phosphoric acid is normally poured into the high-pressure drum 72 for the purpose of pH adjustment for water quality management, the phosphoric acid becomes an interference component, making it difficult to measure the acid electrical conductivity of the drum water W3. Performing the control described above eliminates the need of pouring phosphoric acid conventionally used as a pH adjusting agent of the drum water W3, and an acid electrical conductivity of the drum water W3 can be measured without interference by the phosphoric acid. A chlorine ion concentration of the drum water W3 can be calculated on the basis of the acid electrical conductivity, and leakage of the seawater SW can be detected with high accuracy. Since, in a case that seawater leakage occurs, the seawater component is concentrated in the high-pressure drum 72, the seawater SW leaking into the feedwater W can be quickly detected with high accuracy by measuring an acid electrical conductivity of the drum water W3, compared to a case where the acid electrical conductivity is measured at a location other than the high-pressure drum 72.

In the seawater leakage detection device in a feedwater system according to the present embodiment, the pH measurement device 82 or 83 configured to measure a pH value of the feedwater W at a downstream side of a position where ammonia is added in the feedwater line L11 or a pH value of the drum water W3 is provided, and the control device 88 controls the ammonia addition device 81 on the basis of a measurement result of the pH measurement device 82 or 83. Since a pH value of the feedwater W or the drum water W3 in which ammonia is added is fed back to control an added amount of the ammonia, a pH value of the drum water W3 can be managed with high accuracy.

In the seawater leakage detection device in a feedwater system according to the present embodiment, the pH measurement device 83 is provided to the high-pressure drum 72, and a pH value of the drum water W3 in the high-pressure drum 72 is measured. Since the pH value of the drum water W3 concentrated in the high-pressure drum 72 is fed back to control the added amount of ammonia, the pH value of the drum water W3 can be managed with high accuracy.

In the seawater leakage detection device in a feedwater system according to the present embodiment, the heat recovery steam generator 12 includes one or more units that differ from each other in pressure of the feedwater to be treated, that is, the low-pressure unit 41, the intermediate-pressure unit 42, and the high-pressure unit 43, and the acid electrical conductivity meter 84 measures an acid electrical conductivity of the drum water W3 in the high-pressure drum 72 of at least the high-pressure unit 43 at the highest pressure. Since the acid electrical conductivity of the drum water W3 concentrated at high pressure in the high-pressure drum 72 is measured, the acid electrical conductivity of the drum water W3 concentrated to a high concentration for a short period of time is measured, and the presence or absence of the seawater SW leaking into the feedwater W can be detected with high accuracy.

In the seawater leakage detection device in a feedwater system according to the present embodiment, the water discharge devices 85, 86 and 87 configured to discharge the drum waters W1, W2 and W3 inside the respective drums 52, 62 and 72 are provided, and the control device 88 opens the water discharge devices 85, 86 and 87 in a case that a chlorine ion concentration of the drum water W3 exceeds a preset limit value. Since, in a case that the chlorine ion concentration of the drum water W3 exceeds the limit value, the drum waters W1, W2 and W3 in the respective drums 52, 62 and 72 are discharged, the chlorine ion concentration of the drum waters W1, W2 and W3 can be reduced.

In the seawater leakage detection device in a feedwater system of the present embodiment, the pH adjusting agent added by the pH adjusting agent addition device is an alkaline volatile substance. Since a residual component of the pH adjusting agent which is an alkaline volatile substance is not concentrated in the respective drums 52, 62 and 72, and further is discharged out of the feedwater system by the condensed water pump (vacuum pump) 36 of the condenser 35, a very small amount of the pH adjusting agent discharged from a chemical injection device is balanced to keep a concentration of chemicals in the feedwater system constant, and this allows a pH value to be controlled.

In the seawater leakage detection device in a feedwater system according to the present embodiment, the pH adjusting agent added by the pH adjusting agent addition device is amines containing at least one of ammonia, hydrazine, monoethanolamine, or morpholine. Accordingly, an optimum pH adjusting agent can be selected.

A method for detecting seawater leakage in a feedwater system of the present embodiment includes the steps of adding ammonia (pH adjusting agent) to the feedwater W in the feedwater line L11 from the condenser 35 to the heat recovery steam generator 12, adjusting an added amount of ammonia such that a pH value of the drum water W3 in the high-pressure drum 72 of the heat recovery steam generator 12 expresses alkalinity equal to or greater than a preset predetermined value, measuring an acid electrical conductivity of the drum water W3, and calculating a chlorine ion concentration of the drum water W3 on the basis of the acid electrical conductivity and determining whether leakage of the seawater SW is detected.

Since the acid electrical conductivity of the drum water W3 concentrated in the high-pressure drum 72 is measured, in a case that the seawater SW leaks into the feedwater W, a chlorine ion concentration of the drum water W3 in the high-pressure drum 72 increases, and this allows the presence or absence of the seawater SW leaking into the feedwater W to be detected with high accuracy regardless of the amount of leakage of the seawater SW.

A steam turbine plant according to the present embodiment includes the heat recovery steam generator 12 including the high-pressure drum 72 configured to produce the steam S using exhaust heat of the exhaust gas EG, the steam turbine 13 configured to be driven by the steam S produced by the heat recovery steam generator 12, the condenser 35 configured to return the feedwater W produced by cooling the steam S discharged from the steam turbine 13 with the seawater SW to the heat recovery steam generator 12, and the seawater leakage detection device at the feedwater line L11.

Since, an acid electrical conductivity of the drum water W3 concentrated in the high-pressure drum 72 is measured, in a case that the seawater SW leaks into the feedwater W, a chlorine ion concentration of the drum water W3 in the high-pressure drum 72 increases, and this allows the presence or absence of the seawater SW leaking into the feedwater W to be detected with high accuracy regardless of the amount of leakage of the seawater SW.

Note that in the embodiment described above, the heat recovery steam generator 12 includes the low-pressure unit 41, the intermediate-pressure unit 42, the high-pressure unit 43, and the reheater 44; however, the heat recovery steam generator 12 may include only the low-pressure unit 41 and the high-pressure unit 43, or may include only a single unit.

REFERENCE SIGNS LIST

10 Combined cycle plant (steam turbine plant)
11 Gas turbine
12 Heat recovery steam generator
13 Steam turbine
14 Power generator
21 Compressor
22 Combustor
23 Turbine
31 High-pressure turbine
32 Intermediate-pressure turbine
33 Low-pressure turbine
35 Condenser
41 Low-pressure unit
42 Intermediate-pressure unit
43 High-pressure unit
44 Reheater
51 Low-pressure fuel economizer
52 Low-pressure drum (steam drum)
53 Low-pressure evaporator
54 Low-pressure superheater
61 Intermediate-pressure fuel economizer
62 Intermediate-pressure drum (steam drum)
63 Intermediate-pressure evaporator
64 Intermediate-pressure superheater
71 High-pressure fuel economizer
72 High-pressure drum (steam drum)
73 High-pressure evaporator
74 High-pressure superheater
81 Ammonia addition device (pH adjusting agent addition device)
82, 83 pH measurement device
84 Acid electrical conductivity meter
85, 86, 87 Water discharge device
88 Control device

The invention claimed is:

1. A seawater leakage detection device in a feedwater system in a steam turbine plant including a heat recovery steam generator including a steam drum configured to produce steam using exhaust heat of exhaust gas, a steam turbine configured to be driven by the steam produced by the heat recovery steam generator, and a condenser configured to return feedwater produced by cooling steam discharged from the steam turbine with seawater to the heat recovery steam generator, comprising:
a pH adjusting agent addition device configured to add a pH adjusting agent to feedwater at an upstream side of the steam drum in a feedwater line;
an acid electrical conductivity meter configured to measure an acid electrical conductivity of drum water in the steam drum; and
a control device configured to control the pH adjusting agent addition device such that a pH value of the drum water in the heat recovery steam generator expresses alkalinity equal to or greater than a preset predetermined value, calculate a chlorine ion concentration of the drum water on the basis of the acid electrical conductivity measured by the acid electrical conductivity meter while the pH value of the drum water is maintained equal to or greater than the predetermined value, and determine whether seawater leakage is detected.

2. The seawater leakage detection device in a feedwater system according to claim 1,
wherein a pH measurement device configured to measure a pH value of feedwater at a downstream side of a position where a pH adjusting agent is added in the feedwater line or a pH value of drum water is provided, and
the control device controls the pH adjusting agent addition device on the basis of a measurement result of the pH measurement device.

3. The seawater leakage detection device in a feedwater system according to claim 2,
wherein the pH measurement device measures a pH value of drum water in the steam drum.

4. The seawater leakage detection device in a feedwater system according to claim 1,
wherein the heat recovery steam generator includes one or more units that differ from each other in pressure of the feedwater to be treated, and
the acid electrical conductivity meter measures an acid electrical conductivity of drum water in the steam drum of at least a unit at the highest pressure of the one or more units.

5. The seawater leakage detection device in a feedwater system according to claim 1,
wherein a water discharge line configured to discharge drum water in the steam drum is provided, and
the control device opens the water discharge line in a case that a chlorine ion concentration of drum water exceeds a preset limit value.

6. The seawater leakage detection device in a feedwater system according to claim 1,
wherein a pH adjusting agent added by the pH adjusting agent addition device is an alkaline volatile substance.

7. The seawater leakage detection device in a feedwater system according to claim 1,
wherein a pH adjusting agent added by the pH adjusting agent addition device is amines containing at least one of ammonia, hydrazine, monoethanolamine, or morpholine.

8. A steam turbine plant comprising:
a heat recovery steam generator including a steam drum configured to produce steam using exhaust heat of exhaust gas;
a steam turbine configured to be driven by the steam produced by the heat recovery steam generator;
a condenser configured to return feedwater produced by cooling steam discharged from the steam turbine with seawater to the heat recovery steam generator; and
the seawater leakage detection device in a feedwater system according to claim 1.

9. A method for detecting seawater leakage in a feedwater system comprising the steps of:
adding a pH adjusting agent to feedwater in a feedwater line from a condenser to a boiler;
adjusting an added amount of the pH adjusting agent such that a pH value of drum water in a steam drum of the boiler expresses alkalinity equal to or greater than a preset predetermined value;
measuring an acid electrical conductivity of drum water; and calculating a chlorine ion concentration of drum water on the basis of the acid electrical conductivity measured while the pH value of the drum water is maintained equal to or greater than the predetermined value and determining whether seawater leakage is detected.

* * * * *